J. TAYLOR & J. E. RICE.
Corn-Planter.

No. 215,991.  Patented May 27, 1879.

Witnesses:
J. W. Garner
W. S. D. Haines

Inventors:
Jos. Taylor,
Jno. E. Rice,
per
F. A. Lehmann, Atty

UNITED STATES PATENT OFFICE.

JOSEPH TAYLOR AND JOHN E. RICE, OF PAINTSVILLE, KENTUCKY.

IMPROVEMENT IN CORN-PLANTERS.

Specification forming part of Letters Patent No. 215,991, dated May 27, 1879; application filed March 25, 1879.

*To all whom it may concern:*

Be it known that we, JOSEPH TAYLOR and JOHN E. RICE, of Paintsville, in the county of Johnson and State of Kentucky, have invented certain new and useful Improvements in Corn-Planters; and we do hereby declare the following to be a full, clear, and exact description of the invention, such as will enable others skilled in the art to which it pertains to make and use it, reference being had to the accompanying drawings, which form part of this specification.

Our invention relates to an improvement in corn-planters; and it consists in the arrangement and combination of parts, whereby a very cheap, simple, and effective planter is produced, as will be more fully described hereinafter.

Figure 1:
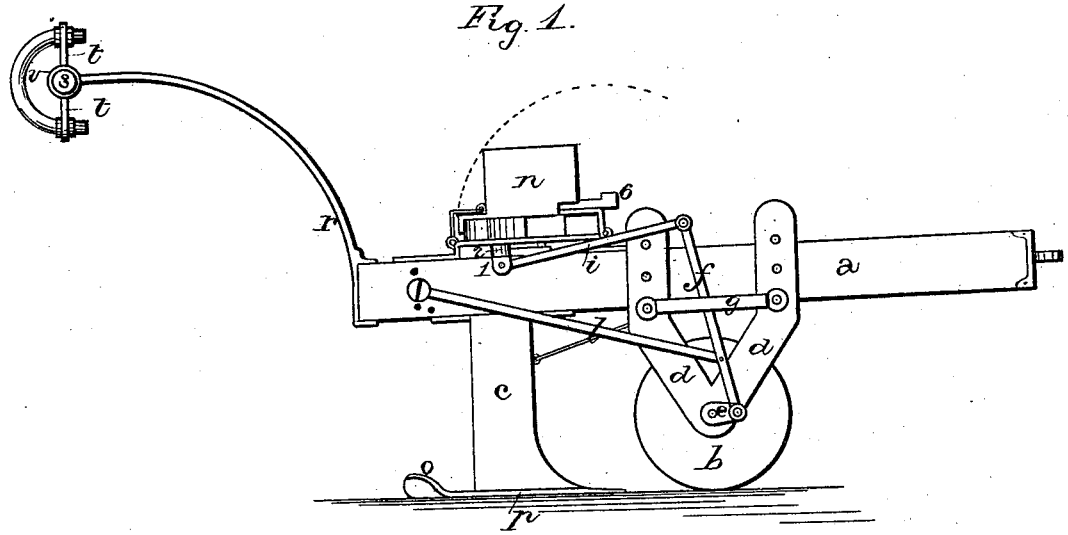
Figure 2:
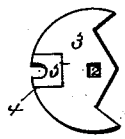
Figure 3:
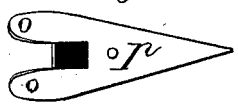

Figure 1 is a side elevation of our invention, and Figs. 2 and 3 are details of the same.

$a$ represents the beam, $c$ the standard, and $b$ the operating-wheel. This wheel is journaled in the lower ends of the hangers $d$, which have a series of holes in their upper ends, so that they can be adjusted vertically to accommodate the wheel to the depth of furrow desired.

Upon one end of the journal of the wheel is formed the crank $e$, to which is fastened the lower end of the operating-rod $f$, which passes up through or under the band $g$, which serves as a guide to keep it in place. To the upper end of this rod $f$ is fastened the connecting-rod $i$, which has its rear end fastened to the arm 1, which partially revolves the square post 2, upon which the feed-plate 3 is placed. As the rod $f$ would have little more than a vertical play by itself, the brace-rod $l$ is provided, which has its rear end fastened to the side of the beam, and its front end fastened to the side of the rod $f$ below its center. As the wheel $b$ revolves, the rod $f$ not only has a vertical play, but it rocks back and forth on the end of the brace, and thereby works the arm 1 back and forth and operates the feed-plate.

When the hangers $d$ are changed in their adjustment the rear end of the brace $l$ is also changed, so as to correspond thereto.

In the edge of the feed-plate 3 is made a notch, 4, in which notch is placed a block, 5, having a hole made in its edge to receive the grains of corn. By changing this block for others having a larger or a smaller hole, any desired number of grains can be dropped at once. Each planter will be furnished with a series of these blocks 5, every one of which has a different sized hole.

Through the bottom of the grain-box $n$ are made two openings, through which the grains of corn drop into the recess in the block 5. This box is hinged or pivoted at its lower front edge, so that it can be raised upward to allow the blocks to be changed in the feed-plate at will, or the plate to be removed. When the plate has the corn fed into the block from both of the openings in the bottom of the box $n$, the corn will be drilled. If so desired, one of the feed-holes in the bottom of the box may be covered over by a slide, 6, which passes through a slot in the bottom, and thus the distance between the grains dropped will be doubled.

This slide is used when the corn is being planted in hills, and dispensed with when the corn is being drilled.

From the feed-plate the corn drops down through the rear side of the standard $c$ to the ground, where it is covered by the coverers $o$ on the rear side of the share $p$. This share, having its rear end bifurcated and turned up so as to form coverers, is formed in a single piece with the point, and is bolted to the under side of the standard.

To the rear end of the beam is fastened the metallic plate $r$, which has an eye on its rear end, through which is passed the rod $s$, which rod is held in place by a set-screw. Over each end of this rod is passed a handle, which consists of a socket, $t$, made of metal, and having a hole through each end, and through these holes are passed the ends of the bent wooden rods $v$. These handles are much more handy and convenient to catch hold of, and enable the operator to manage the planter more easily.

Having thus described our invention, we claim—

1. The combination of the wheel *b*, crank *e*, rod *f*, and brace *l* with the connecting-rod and feed-plate, substantially as shown.

2. The combination of the metallic plate *r*, rod *s*, sockets *t*, and bent rods *v*, substantially as shown.

In testimony that we claim the foregoing we have hereunto set our hands this 8th day of March, 1879.

JOSEPH TAYLOR.
JOHN ELLIOTT RICE.

Witnesses:
B. H. SALYEN,
E. G. LANCASTER.